United States Patent [19]
Barlow et al.

[11] Patent Number: 5,210,757
[45] Date of Patent: May 11, 1993

[54] METHOD AND APPARATUS FOR PERFORMING HEALTH TESTS OF UNITS OF A DATA PROCESSING SYSTEM

[75] Inventors: George J. Barlow, Tewksbury; Richard C. Zelley, North Chelmsford, both of Mass.; James W. Keeley, Nashua, N.H.

[73] Assignee: Bull HN Information Systems Inc., Billerica, Mass.

[21] Appl. No.: 593,408

[22] Filed: Oct. 5, 1990

[51] Int. Cl.$^5$ .................. G06F 9/38; G06F 11/00; G06F 13/00

[52] U.S. Cl. .................. 371/16.1; 371/18; 364/267.1; 364/267.3; 364/267.4; 364/229.2; 364/242.92; 364/DIG. 1

[58] Field of Search .......... 371/16.1, 11.3, 29.5, 371/9.1; 364/187, 186, 267.1, 267.2, 267.4, 229.2, 230.4, 242.92, 945.7, 931.44, 935.41

[56] References Cited

U.S. PATENT DOCUMENTS

| | | | |
|---|---|---|---|
| 4,315,311 | 2/1982 | Causse et al. | 371/16.1 |
| 4,764,862 | 8/1988 | Barlow et al. | 395/200 |
| 4,910,666 | 3/1990 | Nibby, Jr. et al. | 395/575 |

Primary Examiner—Robert W. Beausoliel
Assistant Examiner—Dieu-Minh Le
Attorney, Agent, or Firm—Gary D. Clapp; John S. Solakian

[57] ABSTRACT

A means for ascertaining the health, or basic operational status, of a system unit. A "health check" provides an indication of either "yes", the system unit is operational, or "no", the system unit is either inoperative or there is a question as to whether the system is operational. The test is performed by requesting that the system unit perform a high priority "short" operation and noting the response provided to the request; the actual execution of the request is unimportant and it is the response of the unit under test to the receipt of the request for a bus operation that is the actual indicator of the status of the unit being tested. The requested operation is not directed at the unit whose operational status is to be determined, but instead at a bus interface unit which performs bus operations for the unit to be tested and whose responses to requests for bus operations are effected by the operational status of the unit that is to be tested. The operation is not directed at an actual element in the bus interface unit, but at a phantom, or nonexistent, element.

18 Claims, 4 Drawing Sheets

METHOD AND APPARATUS FOR PERFORMING HEALTH TESTS OF UNITS OF A DATA PROCESSING SYSTEM

Cross References To Related Patent Applications

The following patent applications and patents which are assigned to the same assignee as the present patent application have related subject matter:

1. Data Processing System Having a Bus Command Generated by One Subsystem on Behalf of Another Subsystem, invented by George J. Barlow, Arthur Peters, Richard C. Zelley, Elmer W. Carroll, Chester M. Nibby, Jr., and James W. Keeley, Ser. No. 944,052 filed Dec. 18, 1986 and, now abandoned.

2. Apparatus and Method of Loading A Control Store Memory of a Central Subsystem, invented by Richard C. Zelley, Mark J. Kenna, Jr., and Wallace A. Martland, Ser. No. 943,980, filed Dec. 18, 1986 and issued Apr. 3, 1990 as U.S. Pat. No. 4,914,576.

3. Apparatus and Method for Loading and Verifying A Control Store Memory of a Central Subsystem, invented by Chester M. Nibby, Jr., Richard C. Zelley, Kenneth E. Bruce George J. Barlow, and James W. Keeley, Ser. No. 943,984, filed Dec. 18, 1986 and issued Mar. 20, 1990 as U.S. Pat. No. 4,910,666.

4. Apparatus and Method of Loading Different Control Stores of a Multiprocessor to Provide a Multi-Personality System, Invented by Richard C. Zelley, Mark J. Kenna, Jr., and Wallace A. Martland, Ser. No. 943,985, filed Dec. 18, 1986, now abandoned.

5. Universal Peripheral Controller Self-Configuring Bootloadable Ramware, invented by John A. Klashka, Sidney L. Kaufman, Krzysztof A. Kowal, Richard P. Lewis, Susan L. Raisbeck and John L. McNamara, Jr., Ser. No. 925,431, filed Oct. 31, 1986 and issued Feb. 7, 1989 as U.S. Pat. No. 4,803,623.

6. System Management Apparatus for a Multiprocessor System, invented by George J. Barlow, Elmer W. Carroll, James W. Kelley, Wallace A. Martland, Victor M. Morganti, Arthur Peters and Richard C. Zelley, Ser. No. 869,164, filed May 30, 1986 and continued as Ser. No. 377,785, filed Jul. 6, 1989.

7. Memory System With Automatic Memory Reconfiguration, invented by Robert B. Johnson, Chester M. Nibby, Jr., and Edward R. Salas, Ser. No. 413,631, filed Sep. 3, 1982 and issued Mar. 26, 1985 as U.S. Pat. No. 4,507,730.

8. Memory Controllers With Burst Mode Capability, invented by Robert B. Johnson and Chester M. Nibby, Jr., Ser. No. 202,819, filed Oct. 31, 1980 and issued Dec. 28, 1982 as U.S. Pat. No. 4,366,539.

9. Resilient Bus System, invented by George J. Barlow and James W. Keeley, Ser. No. 717,201, filed Mar. 28, 1985 and issued Aug. 16, 1988 as U.S. Pat. No. 4,764,862.

The following patent is assigned to Honeywell Information Systems Inc. and has related subject matter:

10. Multiprocessor Shared Pipeline Cache Memory With Split Cycle and Concurrent Utilization, invented by James W. Keeley and Thomas F. Joyce, Ser. No. 655,473, filed Sep. 27, 1984 and issued Sep. 22, 1987 as U.S. Pat. No. 4,695,943.

11. Method and Apparatus for Resetting a Memory Upon Power Recovery, invented by Raymond D. Bowden III, Michelle A. Pence, George J. Barlow, Mark E. Sanfacon, and Jeffrey S. Somers, Ser. No. 393,917, filed Oct. 5, 1990, and issued Apr. 20, 1993 as U.S. Pat. No. 5,204,964.

12. Method and Apparatus for Memory Retry, invented by George J. Barlow, Raymond D. Bowden III, and Michelle A. Pence, Ser. No. 693,182, filed Oct. 5, 1990, and issued May 11, 1993 as U.S. Pat. No. 5,210,867.

13. Method and Apparatus for Integrity Testing of Fault Monitoring Logic, invented by David Cushing, Edward Hutchins, Elmer W. Carroll, and James Bertone, Ser. No. 593,179, filed Oct. 5, 1990.

BACKGROUND OF THE INVENTION

1. Field of Use

The present invention relates to the testing of functional units in a data processing system.

2. Prior Art

A recurring problem in data processing systems is that of detecting when faults or errors occur in the functional units of the system, for example, the central processing units of the system. While systems of the prior art have provided means for detecting errors and faults in the system units, the methods used for fault detection means have fallen into two classes, neither completely satisfactory.

One type of fault detection used in the systems of the prior art may be described as "passive" detection, that is, the units of the system included various means for detecting errors or faults in the operation of the unit and notifying a system administrator unit or the operator that a fault had occurred. One problem with this approach was that a system unit may be inoperative for an extended period before the fault is detected by the system administrator and another was that the fault might be such as to prevent the unit from notifying the system administrator of the fault. In this latter case, the fault would most probably be detected when another unit of the system attempted an operation involving the failed unit and gave notice that the attempted operation had failed. In either case, the system could, in fact, be inoperative in important aspects for an extended period before the fault was detected.

In another approach of the prior art, which could be described as "active" detection, a system administrator unit would run fault and error detection operations on the other units of the system, for example, sending commands requiring that the various system units perform selected test operations and noting the results of those test operations. One problem with this approach is that such tests require an excessive amount of system unit and system bus time, indictably reducing the capability of the system to perform useful work. As a result, such tests were run infrequently, and often only after a "passive" fault detection scheme had indicated that there was reason to run fault detection and isolation tests.

The method and apparatus of the present invention for performing "health" tests of the units of a data processing system provides a solution to these and other problems of the prior art.

OBJECTS OF THE INVENTION

It is thereby an object of the present invention to provide an improved method and apparatus for determining faults in the units of a data processing system.

It is another object of the present invention to perform tests of the operational status of units of a data processing system which require the minimum amount of processor unit and system bus time and which cause the minimum disruption of normal operation of the system.

SUMMARY OF THE INVENTION

The present invention provides a means for ascertaining the health, that is, the basic operational status, of a system unit, such as a central processing unit, with minimum interruption of the operations of the unit whose status is being checked and in the minimum number of system bus cycles. The "health check" provides an indication of either "yes", the system unit is operational, or "no", the system unit is either inoperative or there is a question as to whether the system is operational.

In brief, the test is performed by requesting that the system unit perform a high priority "short" operation and noting the response provided to the request; the actual execution of the request is unimportant and it is the response of the unit under test to the receipt of the request for a bus operation that is the actual indicator of the status of the unit being tested.

In another aspect of the system, the requested operation is not directed at the unit whose operational status is to be determined, but instead at a bus interface unit which performs bus operations for the unit to be tested and whose responses to requests for bus operations are effected by the operational status of the unit that is to be tested.

In yet another aspect of the present invention, the requested bus operation is not directed at an actual physical element of the bus interface unit, but at a "phantom" element in the bus interface unit

BRIEF DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF A PREFERRED EMBODIMENT

Figure 1:
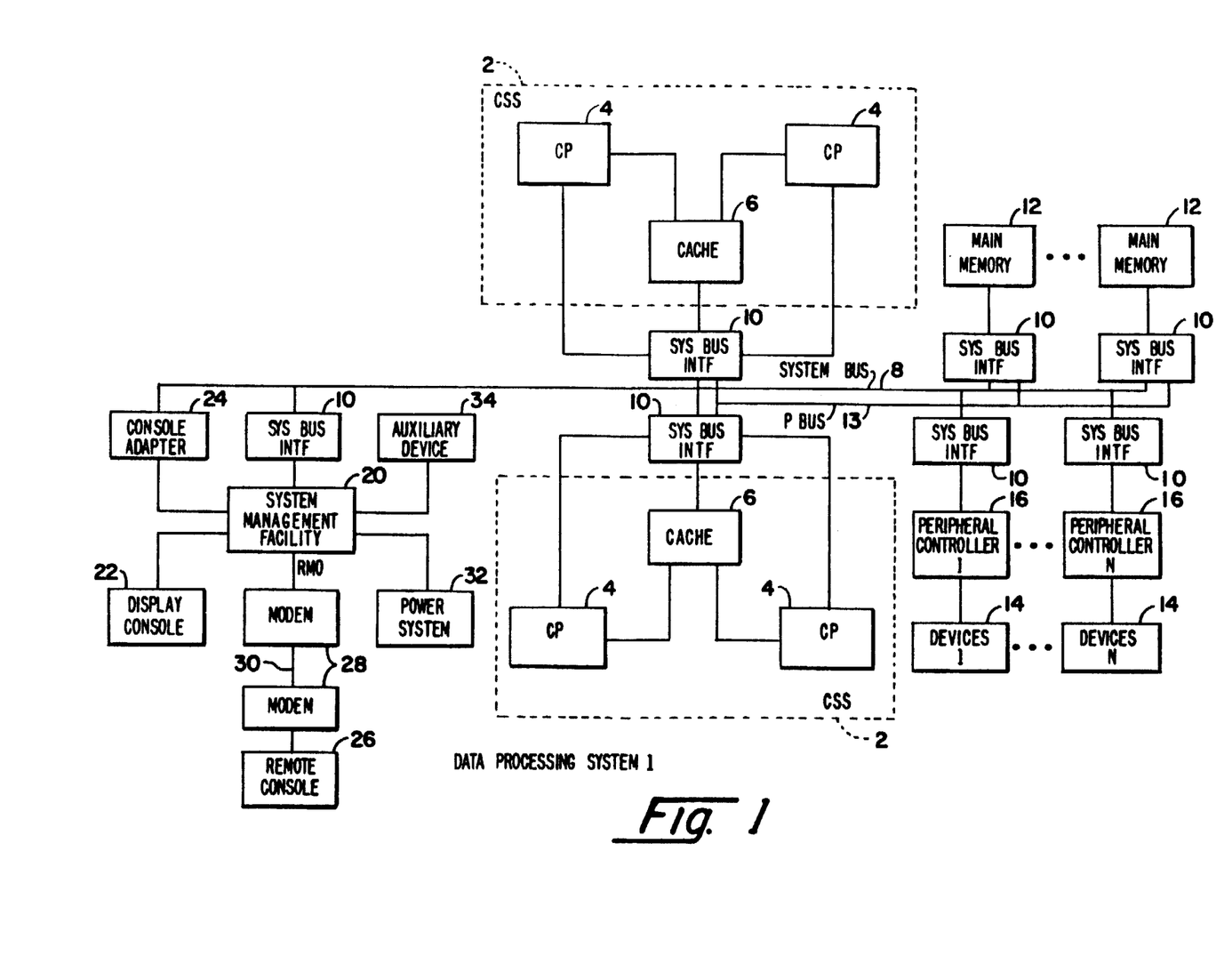
FIG. 1 is a block diagram of an exemplary system incorporating the present invention.

Referring to FIG. 1, therein is represented a block diagram of an exemplary system in which the present invention may be embodied. Data Processing System (DPS) 1 may be, for example, a DPS 6000, Model 400 or Model 600 computer system from Bull HN Information Systems Inc. of Billerica, Mass. The following will describe the structure and operation of DPS 1 only briefly as such systems are generally well known and understood in the art and the exemplary system described specifically herein is described in detail in the previously referenced related patents.

As shown, multiprocessor Data Processing System (DPS) 1 includes a one or more functional units, including one or more Central Sub-Systems (CSSs) 2, each CSS 2 being comprised of a pair of independently operating Central Processors (CPs) 4 sharing access to a Cache 6. Each CP 4 and the Cache 6 of each CSS 2 have access to a System Bus (SYSBUS) 8 through a System Bus Interface (SBI) 10.

DPS 1's functional units include one or more Main Memories 12, which are shared by the CSSs 2 and which are each connected to System Bus 8 through a SBI 10. In addition to SYSBUS 8, DPS 1 includes a Private Bus (PBUS) 13 which is connected between each of Main Memories 12 and each of the CSSs 2 with the Main Memories 12 and the CSSs 2 being connected to PBUS 13 through SBIs 10. PBUS 13 is provided as a means from private, high speed data reads from Main Memories 12 to CSSs 2, while general purpose data transfers and memory write operations are performed through SYSBUS 8.

DPS 1 also includes Peripheral Devices (PDs) 14, such as disk and tape drives and communications devices. Each PD 14 is connected to System Bus 8 through a SBI 10 and an appropriate corresponding Peripheral Device Controller (PDC) 16.

Finally, DPS 1's functional units include a System Management Facility (SMF) 20 with associated system management devices. SMF 20 provides centralized control of DPS 1. Among the operations controlled by SMF 20 are initialization of the DPS 1 system, initialization and control of Quality Logic Testing, that is, system fault testing and detection, and loading of operating system and applications software into Main Memories 12 and CSSs 2. SMF 20 also controls certain overall system operations, including system timing, monitoring of errors and faults, and monitoring of system operating temperature and system power.

Associated with SMF 20 are a Display Console 22 connected to SMF 20, which allows direct communication between a user and DPS 1, and a Console Adapter 24 which provides communication between Display Console 22 and System Bus 8 through SMF 20. Communication between a remote user and DPS 1, for example, for remote diagnostics, may be provided in the same manner as Display Console 22 through a Remote Console 26, which is connected to SMF 20 through Modems 28 and a Communications Link 30. Finally, SMF 20 includes a connection to Power System sensors and controllers 32 and to such Auxiliary Devices 34 as a printer.

Figure 2:
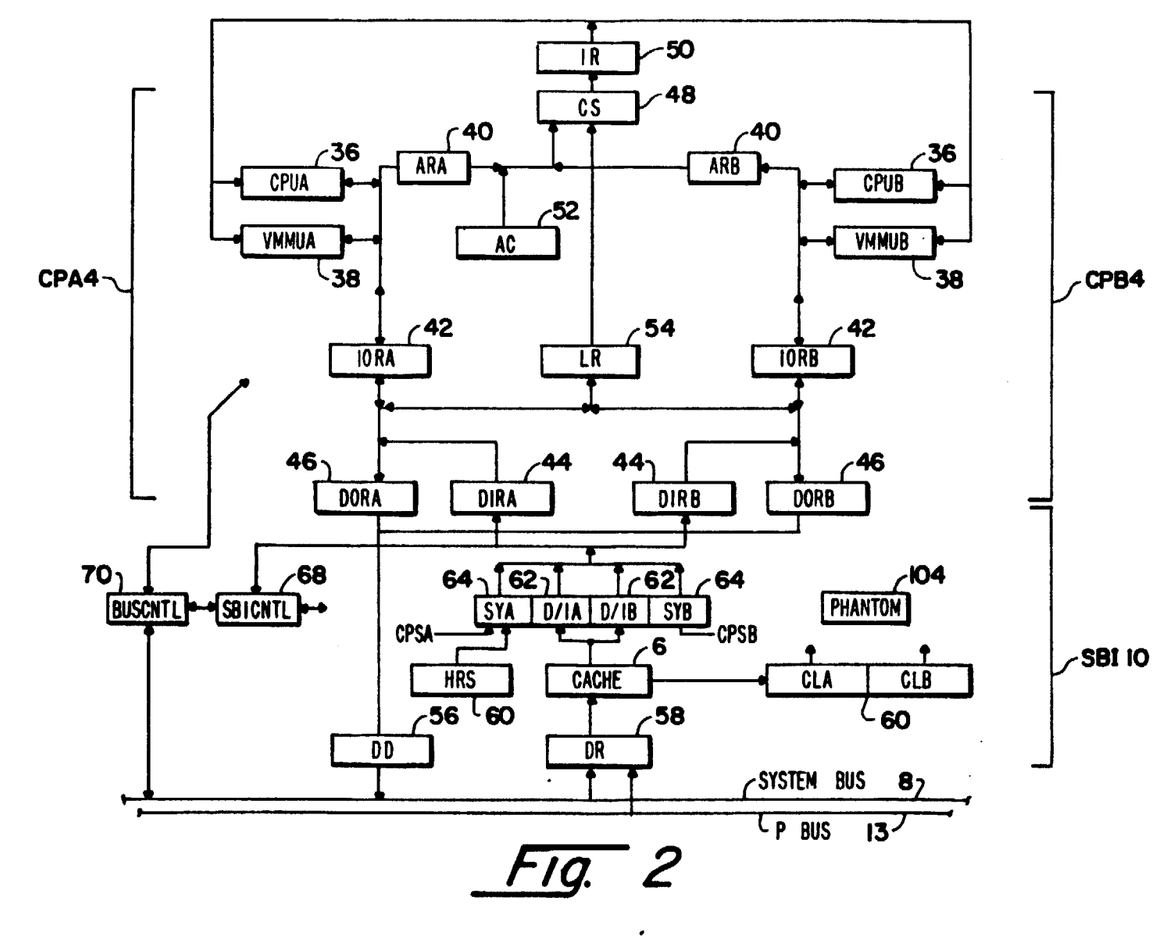
FIG. 2 is a block diagram of a central subsystem and bus interface unit of the exemplary system.

Referring to FIG. 2, therein is represented a simplified block diagram of a CSS 2 with those portions of a CSS 2 comprising CPs 4 and SBI 10 being generally indicated by brackets.

First considering the CPs 4, each CP 4 of a CSS 2, respectively designated as CPA 4 and CPB 4, contains data processing elements which are specific to the CP 4, while certain processing control elements of the CSS 2 are shared between the CP 4's. In particular, each CP 4's processing elements include a Central Processing Unit (CPU) 36 with an associated Virtual Memory Management Unit (VMMU) 38, an Address Register 40, and a data Input/Output Register (IOR) 42. As is well understood in the art, the CPU 36s perform the actual data processing operations under control of microinstruction programs, frequently referred to as microcode programs, or routines, provided from the control elements of a CSS 2 in response to applications program or operating system instructions provided from the MM 12s. The VMMU 38s manage and control memory related operations, such as the reading and writing of data and programs from and to the MM 12s.

Figure 3:
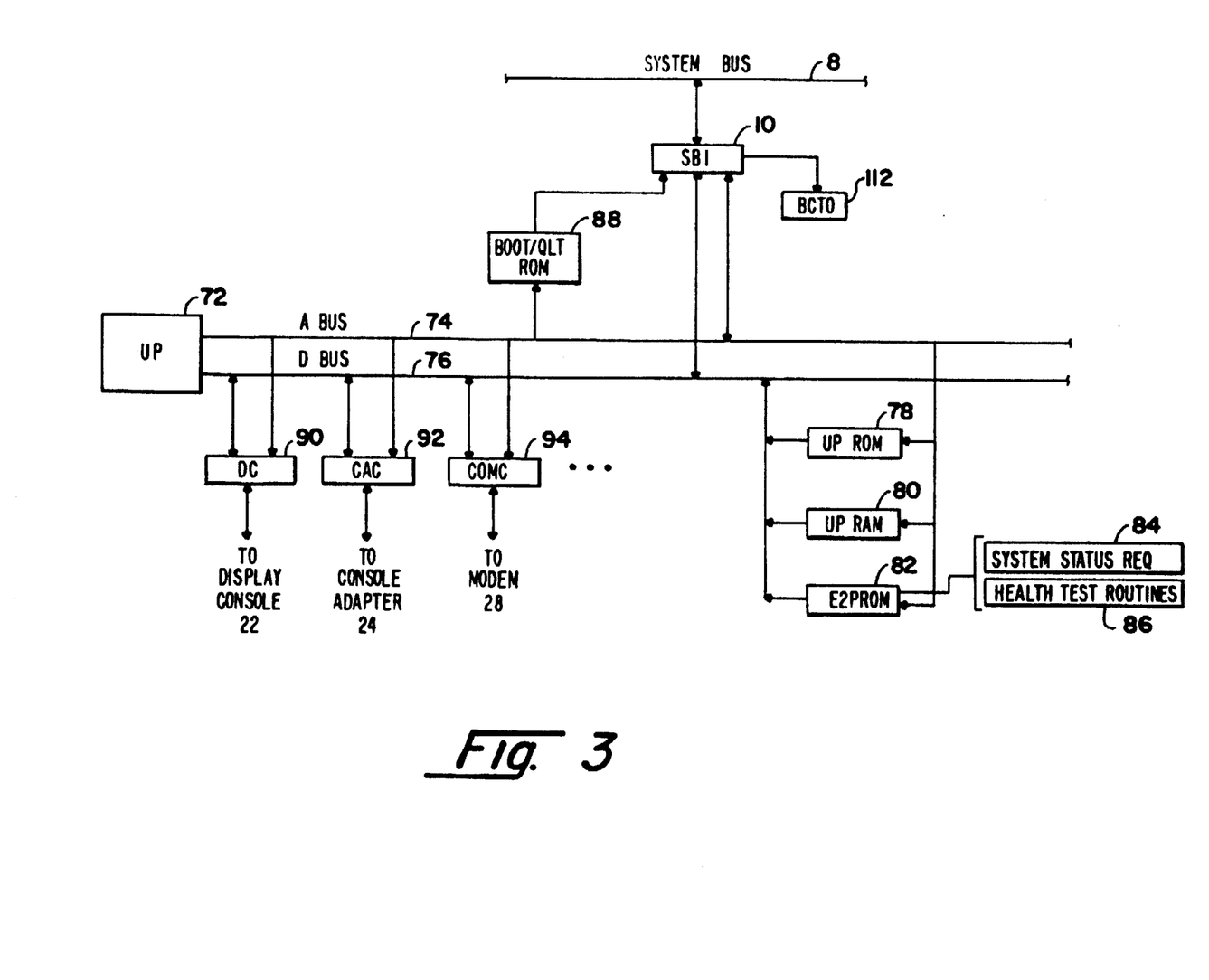
FIG. 3 is a block diagram of a system manager of the exemplary system.

Each CP 4 also has associated with it a Data Input Register (DIR) 44 and a Data Output Register (DOR) 46 connected to SBI 10 and to the CSS 2's Cache 6 for the transfer of data into and out of the CP 4s and the reading of program instructions from the MM 12s to the CSS 2. Cache 6 and the DIR 44 and DOR 46 of the two CP 4s are shown in FIG. 3 as associated with the SBI 10, but may also be regarded as associated with the CP 4s of CSS 2.

For clarity of representation, the data processing elements and other related elements of the two CP 4s, such as the DIRs 44 and DORs 46, are respectively designated by the addition of the suffix A or B to the element designations. That is, the CPU 36s of two CPA 4 and CPB 4 are respectively designated as CPUA 36 and CPUB 36, the VMMU 38s as VMMUA 38 and VMMUB 38, the two DIRs 44 as DIRA 44 and DIRB 44, the two DORs 46 as DORA 46 and DORB 46, and so on.

As the function and operation of processing units such as CPUs 36, VMMUs 38, ARs 40, IORs 42, DIRs 44 and DORs 46 and well known and understood by those of ordinary skill in the art, these units will not be discussed in further detail herein. In addition, these units of the exemplary system are well described in the previously referenced related patents.

The elements shared between the CP 4s comprise the elements controlling the operations of the two CP 4s and include the Control Store (CS) 48. CS 48 is used to store the operating microinstruction programs, or routines, controlling the detailed operations of the two CPs 4 in response to higher level instructions, for example, of the applications programs and operating system.

An Instruction Register (IR) 50 is associated with CS 48 to provide the microinstructions from CS 48 to the processing elements of the two CPs 4. As described in the previously referenced related patents, the two CPs 4 share the microcode routines stored in CS 48. In an alternate embodiment of DPS 1, however, also described in the related patents, each CP 4 could have its own control store, instruction register, and related elements. The modifications to a CSS 2 to use either a single, unified control store or separate control stores will be well understood by those skilled in the art, in particular after reference to the related patents.

The shared control elements also include an Address Counter (AC) 52, which is used to generate sequential addresses for reading sequences of microinstructions from the microinstruction programs stored in CS 48 or in loading the microinstruction programs into CS 48, and a Load Register (LR) 54, which is used in writing microcode routines into the CS 48 through the SBI 10. As described above in association with CS 48, these elements could be separate for the two CPs 4 in alternate embodiments of DPS 1.

Again, the functions and operations of these processor control elements are both well understood by those familiar with the art and described in detail in the referenced related patents.

Referring to the SBI 10 related portions of the CSS 2, as described above the two DIRs 44, the DIRs 44, the DORs 46 and the Cache 6 may equally well be regarded as a part of the CS 2's SBI 10 as parts of the two CPs 4.

An SBI 10 further includes Data Drivers (DDs) 56, comprised of line drivers, for transferring information from DORs 46 from CPs 4 to System Bus 8 and Data Receivers (DRs) 58, comprised of line receivers, for receiving information from System Bus (SYSBUS) 8 and Private Bus (PBUS) 13.

In the system illustrated herein, the outputs of DRs 58 are connected into Cache 6. In alternate embodiments, the element shown as Cache 6 may be implemented as a set of registers for receiving the data and instructions from SYSBUS 8 and PBUS 13, or as a set of registers arranged as a First-In-First-Out (FIFO) memory, rather than as a full cache.

Cache 6 in turn provides outputs to Control Logic (CL) 60, which comprised of Control Logic A (CLA) 60 and Control Logic B (CLB) 60. CLA 60 and CLB 60 respectively provide outputs to the two CPs 4 to direct certain operations of the CP 4, for example, the loading of firmware into CS 48. Cache 6 also provides outputs to Data and Interrupt (D/I) Registers 62, shown as DIA 62 and DIB 62, which in turn respectively provide data, interrupt commands and instructions, received from SYSBUS 8 and PBUS 13 and through Cache 6, to DIRA 44 and DIRB 44 of the CPs 4.

Associated with DIA 62 and DIRB 62 are a pair of Syndrome Registers, SYA 64 and SYB 64, connected respectively from CPA 4 and CPB 4 to receive and store signals CP Status A (CPSA) and CP Status B (CPSB) indicating the state of operation of the respective CPs 4. Among these signals are a first signal indicating whether the particular CP 4 is present in the system, a second signal indicating whether the CP 4 has detected an error in its operation, and a third signal indicating whether the CP 4 is operating in a state which prevents it from responding to a request for an operation from another unit of DPS 1, such as when the CP 4 is being loaded with firmware at system initialization or when the CP 4 has suffered a catastrophic failure.

Associated in turn with SYA 64 is a Hardware Revision Store (HRS) 66 for storing information identifying the particular revision or configuration of the hardware comprising the CSS 2. As is described in the referenced related patents, this information is read from the HRS 66 of the CSS 2 by SMF 20 at system initialization to select the particular matching revision of the firmware controlling the operation of the CSS 2.

Finally, SBI 10 includes an SBI Control (SBICNTL) 68 containing the timing and logic functions necessary to control the operations of the SBI 10 and a Bus Control (BUSCNTL) 70 for controlling the operations of SBI 1: with respect to bus transfer operations between the SBI 10 or the CSS 2 and other units of DPS 1, such as SMF 20. As will be described briefly below, BUSCNTL 70 is responsible for controlling bus operations for both SBI 10 and CSS 2. When a particular bus operation involves the SBI 10, BUSCNTL 70 will interact with SBICNTL 68, providing the control and timing signals as necessary to direct SBICNTL 68 in controlling the operations of SBI 10 as necessary to execute the bus operation. If the bus operation involves the CSS 2, BUSCNTL 70 will interact in a similar manner with the control logic of the CSS 2 to execute the bus operation. Both BUSCNTL 70 and SBICNTL 68 are conventional and are described in further detail in the referenced related patents and accordingly their detailed designs will not be described further as such functions are familiar to those of ordinary skill in the art.

Briefly considering the bus operations executed by the units of DPS 1, as was previously described, the various units of DPS 1, such as SMF 20 and a CSS 2 may communicate through SYSBUS 8 by executing the protocols for bus transfer operations described in the previously referenced related patents. The various signals used in the bus transfer operations include address and data fields, for communicating, for example, the identity of a system unit with which is the recipient of a bus request, the address of a memory location or register within the unit which is to be read or written to, fields indicating the type of operation to be performed, for example, a read or write operation, and various control and handshake signals.

Each bus operation is executed in two phases. In the first, the system unit initiating the operation, referred to as the master unit for the operation, asserts the request by placing control and handshake signals on SYSBUS 8 to initiate the operation. These signals include signals indicating the type of operation to by performed and the address of the location within the system unit which is the target, or recipient of the request, referred to as the slave unit for the operation. The slave unit then responds to the request by either accepting the request or by refusing the request, for example, by refusing to acknowledge the request, by asking the master unit to wait, or by simply not responding. Assuming that the request is accepted, the actual data transfer takes place in the second phase. In the exemplary system described herein, a certain bus requests, referred to herein as "short" operations, may be executed within a single bus cycle; the request is asserted and accepted in the first half cycle, that is, the first phase, and the data transfer, the second phase, being executed in the second half cycle. Other bus operations, for example, involving the transfer of multiple data words, may require several bus cycles.

BUSCNTL 70 is responsive to the addresses provided on these address lines as part of a request for a bus operation to detect whether the SBI 10, or the CSS 2, contains the address with which the bus operation is to be performed, for example, a read or write of a register, such as a SY 64. If the address of a request refers to a register or other location in the SBI 10, BUSCNTL 70 will, as described, issue the necessary commands and timing signals to execute the requested operation using that register.

Also of particular interest with regard to the present invention is that BUSCNTL 70 also includes bus access arbitration logic which, when presented with conflicting requests for bus operations from two or more system units, resolves the requests to grant access to the requesting unit having the highest assigned priority. For example, in the present system SMF 20, being the system administrator, has priority over all other system units in gaining access to SYSBUS 8 and the SBI 10 will give priority to bus request from SMF 20 over any other requests also present on SYSBUS 8.

As described, the SBI 10 for a CSS 2 must direct bus operations for both the SBI 10 itself and for the CSS 2 as the SBI 10 contains both the BUSCNTL 70 for both the SBI 10 and the CSS 2 and contains the CACHE 6 and registers through which the CSS 2 communicates with SYSBUS 8.

Assuming, for example, that SMF 20 has requested a bus operation with CSS 2, such as a read from or a write to a CSS 2 register, the BUSCNTL 70 will respond by directing the SBI 10 to load the address, data and control fields of the request into Cache 6. These fields will subsequently be read into the DIs 62 and from the DIs 62 to the CPs 4 and executed by the CPs 4 of the CSS 2 under control of corresponding routines stored in CS 48. These routines will interact with BUSCNTL 70 to provide the appropriate control and handshake signals to SYSBUS 8 for the requested operation.

If SMF 20 had requested a bus operation with SBI 10 itself, such as a read from SYA 64 or SYB 64, the request would be executed under the control of SBICNTL 68 and SBICNTL 68 would interact with BUSCNTL 70 to provide the appropriate control and handshake signals to SYSBUS 8.

It should be noted that, in either case, BUSCNTL 70 may operate as both the master unit, that is, as the unit responding to a command from either CSS 2 or SBI 10 to initiate the bus operation, and as the slave unit, responding to a request from another unit of DPS 1, such as SMF 20.

It should also be noted, with particular regard to the present invention, that the operations of SBI 10 and BUSCNTL 70 are at least in part under the control of certain of the syndrome bits stored in SYA 64 and SYB 64. In particular, SYA 64 and SYB 64 each store a "system operational" bit indicating whether the CP 4 is operating in a state which prevents it from responding to a request for an operation from another unit of DPS 1. If this bit is set, the response of the SBI 10 to requests for bus operations will be inhibited; as was described, this bit may be set if the CP 4 is being loaded with firmware at system initialization or if the CP 4 has suffered a catastrophic failure, such as two consecutive critical errors.

Referring to FIG. 3, therein is presented a simplified block diagram of SMF 20. As shown, SMF 20 is essentially a general purpose central processing unit executing programs designed to perform specialized functions. Among these functions are system initialization and test, including the initial loading of microcode routines into the CS 48s of the CSS 2s and the loading of Quality Logic Test (QLT) programs into the MM 12s and the execution of such QLT programs to test the proper operation of DPS 1 and detect errors or faults in the operations of the CSS 2s, MM 12s and other units of DPS 1.

SMF 20 includes a Microprocessor (UP) 72, which controls and performs the operations of SMF 20 under direction of programs stored in SMF 20's memory elements, and an Address Bus 74 and a Data Bus 76 connecting UP 72 and the other elements of SMF 20 for communication of data and instructions among the element of SMF 20.

The memory elements of SMF 20 include a Microprocessor Read Only Memory (UPROM) 78, which stores the programs directly controlling UP 72, that is, UP 72's microcode routines Data used by and generated SMF 20 and certain programs controlling the operations of SMF 20 are stored in a Microprocessor Random Access Memory (UPRAM) 80, as is typical in most computer systems.

An Electronically Erasable Programmable Read Only Memory (E2PROM) 82 is provided for long term storage of certain programs and information which are to be permanently resident in SMF 20, unless deliberately erased or overwritten by the system user. Such programs would include the initialization program, or bootload program, for SMF 20, passwords and password programs for controlling access to DPS 1 and SMF 20, information identifying the Peripheral Device 14 storing the system initialization (boot) software, MM 12 locations assigned for specific functions, such as storing boot and QLT programs, information as to which test programs are to be executed and the results to be expected from such programs, and information as to which of Peripheral Devices 14 contain the programs or microcode for controlling CSS 2s.

E2PROM 82 will also store and provide test programs for the self test of SMF 20, the testing of System Bus 8, and testing of various device's interfaces with System Bus 8, such as the SBI 10 of CSS 2, and such elements as CSS 2's Cache 6, DIR 44s and DORs 46, all of which are accessible from System Bus 8 and which perform functions related to the transfer of information to and from System Bus 8.

Among the information and programs stored in E2PROM 82 are certain of the information and programs comprising the present invention. For example, the information stored in E2PROM 82 includes a System Status Register 84 containing information identifying how many CPs 4 are present in DPS 1, and the operational status of each, that is, whether each CP 4 is presently active or inactive. Also, among the programs stored in E2PROM 82 are the Health Test Routines 86 of the present invention for performing a health check of the presently active CPs 4.

Finally, a Boot and QLT Read Only Memory (BOOT/QLT ROM) 88 is provided to store programs for controlling operation of DPS 1 during initialization, such as a programs for controlling the initial loading, or booting, of software into DPS 1 and for selecting QLT programs to be executed at system initialization.

SMF 20 also includes a number of device controllers for controlling the peripheral devices of SMF 20, such as a Display Controller (DC) 90 for interfacing SMF 20 with Display Console 22, a Console Adapter Controller (CAC) 92 for interfacing SMF 20 to Console Adapter 24, and a Communications Controller (COMC) 94 for interfacing SMF 20 with Modem 28.

Finally, the elements of SMF 20 are connected, through A Bus 74 and D Bus 76, to System Bus 8 through an SBI 10, which may differ in detail from that previously described with reference to CSS 2 but which performs the same general functions with respect to bus operations. BOOT/QLT ROM 88 which, as described, stores programs for controlling the initialization and testing of other units of DPS 1, such as the CSS 2s and MM 12s, is connected directly through SBI 10 to System Bus 8.

SMF 20 will not be described in further detail as the general structure and operation of such units in a system, are, in general, well known in the art and are described in detail in the referenced related patents.

Turning now to the present invention, as was described the present invention provides a means for ascertaining the health, that is, the basic operational status, of a system unit, such as a CP4, with minimum interruption of the operations of the unit whose status is being checked and in the minimum number of system bus cycles. The "health check" provides an indication of either "yes", the system unit is operational, or "no", the system unit is either in-operative or there is a question as to whether the system is operational.

In brief, the test is performed by requesting that the system unit perform a high priority "short" operation and noting the response provided to the request; the actual execution of the request is unimportant and it is the response of the unit under test to the receipt of the request for a bus operation that is the actual indicator of the status of the unit being tested.

A "yes" result is taken as an indication that the system unit is healthy, that it is at least capable of performing the requested operation. A "no" result is taken as an indication that the system unit is inoperative, that it either is inoperative or is not capable of performing a simple, direct operation or that there is a question regarding the operational status of the unit; the health check may then initiate more extensive tests of the system unit.

A further aspect of the invention is that the test is not necessarily performed directly on the system unit itself, but indirectly and on a system unit whose operation is effected by the operational status of the unit to be tested. For example, and assuming that the test is to be performed with respect to a CP 4 in the exemplary system, the test is performed by requesting the operation be performed by the CP 4's System Bus Interface (SBI) 10. As was described, certain error conditions within a CP 4 will cause the "system operational" syndrome bit to be set in the SY 64 of the SBI 10, and the "system operational" bit will in turn inhibit the SBI 10 from responding to any bus requests.

Considering the invention in further detail, and as implemented in the exemplary system, it was described that SMF 20, in addition to performing the functions of system administrator, performs most of the fault and error monitoring and detection operations for the system. Accordingly, SMF 20 is accorded the highest priority for system bus access, that is, any request asserted by SMF 20 will take precedence over any request asserted by any other unit of the system. It should be noted that any system unit having system administrative functions and a suitably high priority for bus access may perform the test of the present invention on other units of the system; certain systems, for example, do not include a system unit dedicated to system administrative functions, such as SMF 20, but either assign those duties to one of the CSSs 2 in the system or share those duties among the CSSs 2 of the system.

Figure 4:
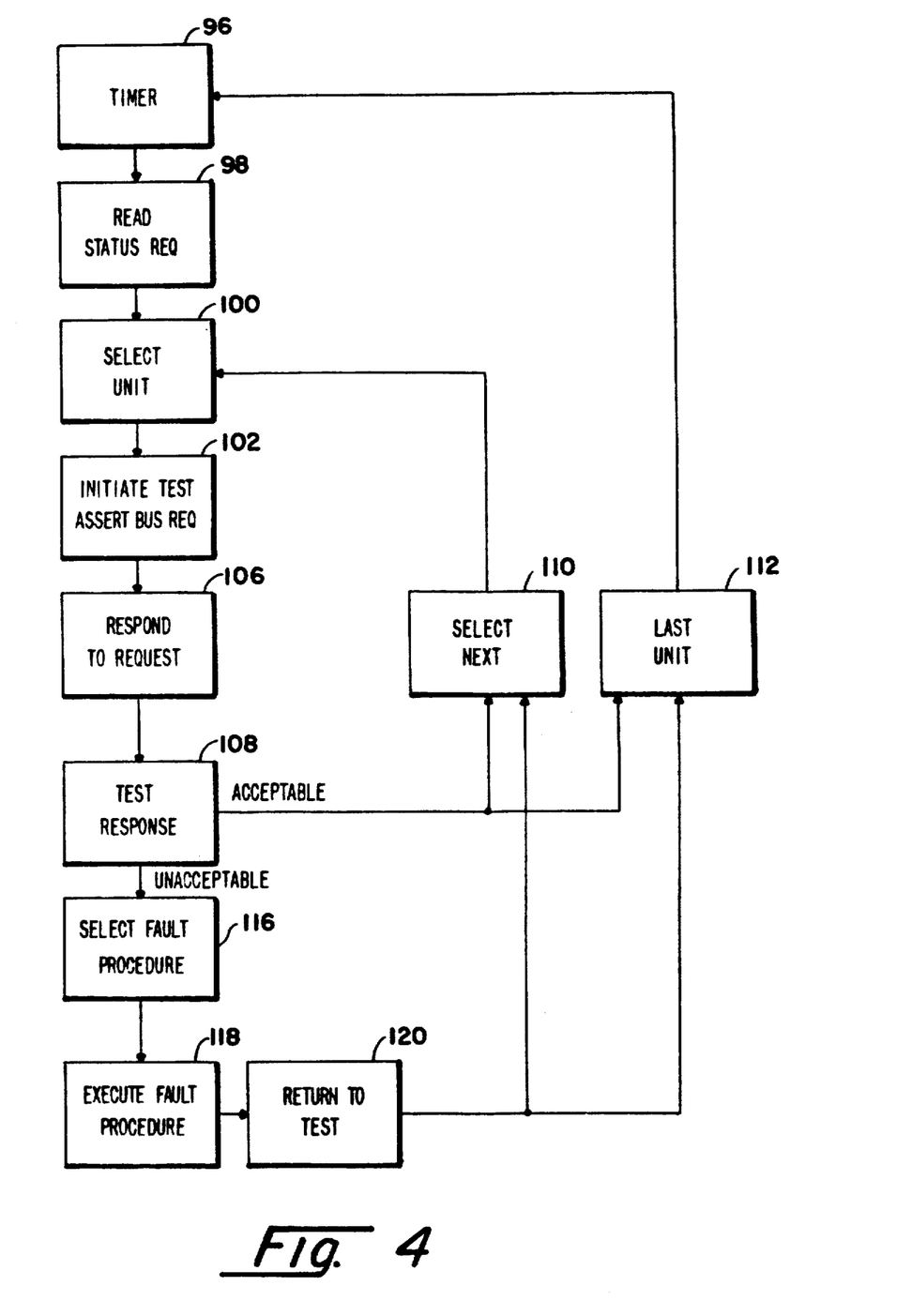
FIG. 4 is a flow diagram illustrating the health test operation of the present invention.

The health test is thereby executed by and under the control of SMF 20, which serves as the master unit in asserting the requested operation while the system unit to be tested is the slave unit for the operation. The health test, illustrated in the flow chart of FIG. 4, is, as described, performed by Health Test Routines 86 stored in E2PROM 82. These routines include a timer function which [Step 96] periodically initiates the test of the CSSs 2 then present and operational in the system. The routines first [Step 98] read System Status Register 84 to determine what CPs 4 are present and operative in the system to determine which corresponding SBIs 10 should be queried with the test request.

Health Test Routines [Step 100] then selects a first CP 4 from the set of present and operational CPs 4 and, [Step 102] initiates the health test for that CP 4 by asserting a bus request for a write operation to a register in that CP 4's SBI 10.

As was described, it is preferable that the bus operation used for the test be a "short" operation, that is, an operation which requires the minimum bus time to complete. A write operation is used for the test because, in the exemplary system and in most systems, a write operation of a single word may be completed within one system bus cycle, so that the test for that system unit may be completed with the minimum use of system bus time. It should be understood, however, that other bus operations may be used, depending upon the particular system in which the test is implemented and the bus requirements for various bus operations in the system.

It should be noted that the write operation is not necessarily directed to an actual register in the SBI 10 and, in the present implementation, is directed to a "phantom", or nonexistent, register indicated as Phantom Register (PHANTOM) 104 in the SBI 10 of FIG. 2. While the phantom register does not actually exist in the SBI 10, the address of the phantom register is among the addresses recognized and accepted by the SBI 10's BUSCNTL 70 as representing an addressable element of the SBI 10 and the BUSCNTL 70 will respond to the request as if the phantom register had physical existence. It should be noted, however, that BUSCNTL 70 and SBICNTL do not necessarily contain the routines to actually execute a bus operation with respect to the phantom register as, as described, the test is concerned only with whether the SBI 10 accepts the request for a bus operation, not with whether the operation is actually executed.

The use of a phantom register is possible because the test does not require that the write operation actually be executed; as described, it is the response of the SBI 10 to the request for a write operation which determines the outcome of the health test, not the execution of the requested operation.

The use of a phantom register is also advantageous in that the test does not needlessly use up a register in the SBI 10 and, by using a nonexistent register, reduces the possibility of an error in operation cause by some other routine reading from or writing to that register.

The BUSCNTL 70 of a system unit, for example, the SBI 10 to which the health test request is submitted, is capable of only a limited set of responses to a request for any bus operation and responds to the bus request in [Step] of the procedure. In [Step 108] of the procedure the Health Test Routines test the response given by the BUSCNTL 70 of the unit under test to determine the outcome of the test.

Firstly, the BUSCNTL 70 may respond by accepting the request for the "short" operation. This response, and only this response, is accepted as a "yes" result and taken as an indication that the system unit is healthy, that it is at least capable of preforming the requested operation. If this is the response given by the unit under test, then the procedure will [Step 110] check whether the system unit being tested is the last unit to be tested (Last Unit?) and, if the present unit is not the last unit to be tested (No), the procedure will proceed to select a next CP 4 to be tested. If it is determined [Step 11] that the system unit being tested is the last unit to be tested yes, the procedure will then return to the timing loop [Step 96] to again initiate the health test procedure at the proscribed interval.

Considering the unacceptable responses from the SBI 10, that is, the responses resulting in a "no" result for the health test, the BUSCNTL 70 may not respond at all, which would be the case, for example, if the SBI 10 or the CBS 2 were inoperative or if, again for example, the CSS 2 had set the "operational status" bit in the syndrome register because it had suffered two consecutive critical errors of faults. In this instance, a Bus Cycle Time-Out Timer (BCTO) 112, shown in FIG. 3, associated with the SMF 20's SBI 10 will detect that the bus operation has continued for longer than the permitted period without a response from the slave unit and will assert a time-out Not-Acknowledge (NAK) signal to the SMF 20's SBI 10.

BUSCNTL 70 of the SBI 10 ma also respond with a Not Acknowledge (NAK), thereby explicitly refusing to accept the request, or a "WAIT", not refusing the request but asking the master unit, that is, SMF 20, to wait before the request can be accepted. Both of these responses are considered as unacceptable and as comprising a "no" result for the est. As was described, SMF 20 has the highest priority in the system with regard to bus requests and a NAK or WAIT to a high priority request is taken as an indication that the SBI 10 or the CP 4 of the CSS 2 is not operating in an acceptable manner.

If the test of the slave unit response [Step 108] indicates that an unacceptable response to the request has been received, the procedure will branch [Step 116] to the system fault handling procedures and [Step 118] execute the appropriate fault handling procedure. As such fault handling procedures are well know in the art, these procedures will not be described in detail.

Having executed the appropriate fault handling procedure, the system will ]Step 120] return to the health test loops [Step to either perform the health test on the next system unit or [Step 112] return to the timing loop to again perform the health test at the proscribed interval. The procedure will [Step 122] check which the system unit which was tested by the fault procedure of Steps 116 and 118 was the last unit to be test (Last Unit?). If the unit tested was not the last unit to be tested (No) the procedure will return to [Step 100] select a next CP 4 to be tested and, if the unit test was the last unit to be tested (Yes) the procedure will return to the timing loop [Step 96] to again initiate the health test procedure at the prescribed interval.

While the invention has been particularly shown and described with reference to a preferred embodiment of the method thereof, it will be understood by those of ordinary skill in the art that various changes in form, details and implementation maybe made therein without departing from the spirit and scope of the invention as defined by the appended claims.

What is claimed is:

1. In a data processing system having at least one data processing unit for performing data processing operations, a system manager unit for performing administrative functions of the system, the administrative functions including system fault testing and detection, and a system bus connected between the data processing units and the system manager unit for performing bus operations, the system manager unit and each data processing unit including bus control means for asserting a request for a bus operation, the system manager unit having priority of access to the bus and each data processing unit bus control means being responsive to requests for bus operations asserted on the bus by the system manager unit and by other data processing units and responsive to the state of operation of the data processing unit for responding to the bus operation requests, a method for periodically testing the basic state of operation of a data processing unit during operation of the data processing system, comprising the steps of:

(a) in the system manager unit and by operation of a timer means, periodically generating a timing signal initiating a test of the basic state of operation of the data processing units,    (b) in the system manager unit and responsive to the timing signal,    (c) selecting a data processing unit to be tested and asserting a request to the selected data processing unit for a bus operation,    (d) in the selected data processing unit, providing on the bus a response to the bus operation request, the response being dependent upon the state of operation of the data processing unit, and (e) in the system manager unit, testing the response provided on the bus by the selected data processing unit in response to the bus operation request asserted by the system manger unit, and (f) in the system manager unit, determining when the response provided by the selected data processing unit in response to the bus operation request indicates that the selected data processing unit is at least operation for receiving and responding to bus operation requests, and (g) in the system manager unit, returning to step (c) and selecting a next data processing unit to be tested when the selected data processing unit is not the last data processing unit to be tested, and returning to step (a) when the selected data processing unit is the last data processing unit to be tested.

2. The method for testing the basic state of operation of a data processing unit of claim 1, wherein:

the system manager unit is responsive to a data processing unit response indicating acceptance of the request to determine that the data processing unit is at least operational for receiving and responding to bus operation requests.

3. The method for testing the basic state of operation of a data processing unit of claim 1, wherein:

the system manager unit is responsive to a data processing unit response indicating that the request has not been accepted to determine that the data processing unit is not operational for receiving and responding to bus operation requests.

4. The method for testing the basic state of operation of a data processing unit of claim 1, wherein:

the bus operation requested by the system manger unit is a request for a short bus operation.

5. The method for testing the basic state of operation of a data processing unit of claim 1, wherein:

the bus operation requested by the system manager unit is for a write operation into a register of the data processing unit.

6. The method for testing the basic state of operation of a data processing unit of claim 5, wherein:

the bus operation requested by the system manager is for a write operation into a phantom register of the data processing unit, wherein a phantom register is a non-existent register having an address among the addresses recognized by the data processing unit to be tested.

7. The method for testing the basic state of operation of a data processing unit of claim 1, wherein:

the data processing unit is comprised of a central processor means for performing data processing operations and a bus interface means responsive to the state of operation of the central processor means for performing bus operations for the central processor means, and the bus operation requested by the system manager unit is for a short bus operation to a register of the bus interface means.

8. The method for testing the basic state of operation of a data processing unit of claim 7, wherein:

the short bus operation requested by the system manager unit is for a write operation into the register of the bus interface means.

9. The method for testing the basic state of operation of a data processing unit of claim 8, wherein:

the bus control element to be written into is a phantom register of the bus interface means, wherein a phantom register is a non-existent register having an address among the addresses recognized by the bus interface means of the data processing unit to be tested.

10. In a data processing system having at least one data processing unit for performing data processing operations, a system manager unit for performing administrative functions of the system the administrative functions including system fault testing and detection, and a system bus connected between the data processing units and the system manger unit for performing bus operations, the system manager unit and data processing unit including bus control means for asserting a request for a bus operation, the system manger unit having priority of access to the system bus and each data processing unit bus control means being responsive to requests for bus operations asserted on the system bus by the system manager unit and by other data processing units and responsive to the state of operation of the data processing unit for responding to the requests for bus operations, a means for periodically testing the basic state of operation of a data processing unit during operation of the data processing system, comprising:

in the system manager unit, time means for periodically generating a timing signal for initiating a test of the basic state of operation of the data processing units, in the system manager unit and responsive to the timing signal, means for selecting a data processing unit to be tested and asserting a request to the selected data processing unit for a bus operation by the selected data processing unit, in the selected data processing unit, means for providing on the system bus a response to the bus operation request, the response being dependent upon the state of operation of the data processing unit, and in the system manager unit, test means responsive to the response provided on the system bus by the selected data processing unit in response to the bus operation request asserted by the system manager unit for determining when the response to the request indicates that the selected data processing unit is at least operational for receiving and responding to bus operation requests, and in the system manger unit, means for selecting a next at a processing unit to be tested when the selected data processing unit is not the last data processing unit and terminating the test of the basic operation of the data processing unit when the selected data processing unit is the last data processing unit to be tested.

11. The means for testing the basic state of operation of a data processing unit of claim 10, wherein:

the system manager unit test mean is responsive to a data processing unit response indicating acceptance of the request to determine that the selected data processing unit is at least operational for receiving and responding to bus operation requests.

12. The means for testing the basic state of operation of a data processing unit of claim 10, wherein:

the system manager unit test means is responsive to a data processing unit response indicating that the request has not been accepted to determine that the data processing unit is not operational for receiving and responding to bus operation requests.

13. The means for testing the basic state of operation of a data processing unit of claim 10, wherein:
   the bus operation requested by the system manager unit is for a short bus operation.

14. The means for testing the basic state of operation of a data processing unit of claim 10, wherein:
   the bus operation requested by the system manger unit is for a write operation into a register of the data processing unit.

15. The means for testing the basic state of operation of a data processing unit of claim 14, wherein:
   the bus operation requested by the system manager unit is for a write operation into a phantom register of the data processing unit, wherein
   a phantom register is a non-existent register having an address among the addresses recognized by the bus interface means of the data processing unit to be tested.

16. The means for testing the basic state of operation of a data processing unit of claim 10, wherein:
   the data processing unit is comprised of a data processing means for performing data processing operations and a bus interface means responsive to the state of operation of the data processing means for performing bus operations for the data processing means, and
   the bus operation requested by the system manager unit is for a short bus operation to a register of the bus interface means.

17. The means for testing the basic state of operation of a data processing unit of claim 16, wherein:
   the short bus operation requested by the system manager unit is for a write operation into a register of the bus interface means.

18. The means for testing the basic state of operation of a data processing unit of claim 16, wherein:
   the bus control register to be written into is a phantom register of the bus control element, wherein
   a phantom register is a non-existent register having an address among the addresses recognized by the bus interface means of the data processing unit to be tested.

* * * * *